United States Patent [19]

Dieulesaint et al.

[11] Patent Number: 5,099,454
[45] Date of Patent: Mar. 24, 1992

[54] LIQUID PRESENCE DETECTOR HAVING A COMPOSITE WAVEGUIDE FOR ACOUSTIC WAVES

[75] Inventors: Eugene Dieulesaint, Saint Maur; Daniel Royer, Sainte Genevieve Des Bois; Olivier Legras, Bourges, all of France

[73] Assignee: Materiel et Auxiliaire de Signalisation et de Controle Pour L'Automation, Courbevoie, France

[21] Appl. No.: 555,302

[22] Filed: Jul. 19, 1990

[30] Foreign Application Priority Data

Jul. 20, 1989 [FR] France .................. 89 09805

[51] Int. Cl.⁵ ............................. G01S 15/08
[52] U.S. Cl. ....................... 367/99; 367/908; 340/621; 73/290 V
[58] Field of Search ............ 367/908, 87, 99, 152; 340/621; 181/123, 124; 73/290 V, 290 R

[56] References Cited

U.S. PATENT DOCUMENTS

| | | | |
|---|---|---|---|
| 4,641,139 | 2/1987 | Edvardsson | 73/290 R |
| 4,679,430 | 7/1987 | Scott-Kestin et al. | 340/621 |
| 4,765,186 | 8/1988 | Dieulesqint et al. | 367/908 |

FOREIGN PATENT DOCUMENTS 3516198  6/1986  Fed. Rep. of Germany.
2596515  10/1987  France.
2617965  1/1989  France.

*Primary Examiner*—Daniel T. Pihulic
*Attorney, Agent, or Firm*—Shenier & O'Connor

[57] ABSTRACT

The detector for detecting the presence of a liquid comprises: a) a metal waveguide having a solid cylindrical top first portion of relatively small section with an outside diameter having a first value d1, which first portion is fixed on a support, a cylindrical rigid bottom second portion whose outside diameter has a second value d2 greater than the first value d1, which second portion extends the first portion downwards and is connected thereto by a short linking portion; b) transducer means disposed in the vicinity of the top portion of the waveguide; and c) electronic processing means. The value of the frequency at which the transducer means are excited is selected in such a manner that acoustic wave trains propagate in the cylindrical first portion at the group velocity of low frequency waves, and propagate in the cylindrical second portion at the minimum group velocity corresponding to the point of inflection in the curve of phase velocity as a function of frequency.

11 Claims, 5 Drawing Sheets

LIQUID PRESENCE DETECTOR HAVING A COMPOSITE WAVEGUIDE FOR ACOUSTIC WAVES

The present invention relates to a liquid presence detector having a composite waveguide for acoustic waves, the detector comprising:

(a) a metal waveguide mounted on a support and having a first free end situated in a zone which is not accessible by the liquid, and a second free end situated inside a receptacle containing a liquid, beneath a predetermined plane at the level where the presence or absence of liquid is to be detected;

(b) transducer means disposed in the vicinity of said first free end; and (c) electronic processing means comprising:

(i) circuits for producing excitation pulses at a predetermined frequency fi, which pulses are applied periodically to the transducer means to create incident acoustic waves in the waveguide; and (ii) circuits for detecting pulses delivered by the transducer means in response to an echo of the incident acoustic waves from the second free end of the waveguide in the absence of liquid.

BACKGROUND OF THE INVENTION

A detector of this type has already been described in Document FR-A-2 617 965 which shows the implementation of an acoustic waveguide mounted on the side wall of a receptacle containing a liquid. However, the detector described in the above-mentioned document comprises a waveguide which is fixed in conventional manner on the side wall of the receptacle e.g. by means of a clamp, a sleeve, or a nut directly engaging the side wall of the waveguide. Insofar as the acoustic waveguide is itself made in such a manner as to be highly sensitive, the presence of fixing elements that co-operate directly with the surface of the waveguide may interfere to a greater or lesser extent with the transmission of acoustic waves, consequently having an effect on detection quality.

The present invention seeks particularly to remedy the above-mentioned drawbacks and to provide a detector which is highly sensitive to contact with liquid while remaining insensitive to mechanical forces that may be transmitted by the detector support.

SUMMARY OF THE INVENTION

These objects are achieved by a detector for detecting the presence of a liquid and having a composite waveguide for acoustic waves of the type defined at the beginning of the description, wherein the waveguide has a solid cylindrical top first portion of small section having an outside diameter of a first value d1 and fixed to a support, and a cylindrical rigid bottom second portion whose outside diameter has a second value d2 greater than said first value d1, said second portion extending the cylindrical first portion downwards and being connected thereto by a short linking portion, with the value of the predetermined frequency fi being selected in such a manner that the acoustic wave trains propagate in the cylindrical first portion at the group velocity of low frequency waves and propagate in the cylindrical second portion at the minimum group velocity corresponding to the point of inflection in the curve of phase velocity as a function of frequency.

Advantageously, said cylindrical second portion is tubular in shape.

The short linking portion may have an outside surface which is essentially frustoconical, or else is bell-shaped.

The composite waveguide may be made of stainless steel, for example.

By way of example, the outside diameter of the first cylindrical portion of the waveguide is not less than 10 mm, the outside diameter of the second cylindrical portion of the waveguide lies in the range about 15 mm to about 25 mm, and said predetermined frequency $f_i$ lies in the range about 75 kHz to 175 kHz.

The dimensions of the waveguide may vary over a wide range as a function of the intended application. For example, the length of the first cylindrical portion may be in the range about 50 mm to about 150 mm, the length of the second cylindrical portion may be in the range about 80 mm to about 200 mm, and the length of the linking portion may be in the range about 10 mm to about 30 mm.

In a particular aspect of the invention, the circuits for producing excitation pulses comprise a series connection constituted by a generator, an amplifier having low output impedance, and an inductor whose inductance is determined in association with the capacitance of the transducer means to define a series-resonant circuit at said predetermined frequency $f_i$, and the circuits for detecting the pulses delivered by the transducer means comprise at least one amplifier having high input impedance and display means or means for analyzing the signals delivered by said amplifier.

BRIEF DESCRIPTION OF THE DRAWINGS

Embodiments of the invention are described by way of example with reference to the accompanying drawings, in which.

DETAILED DESCRIPTION

Figure 1:
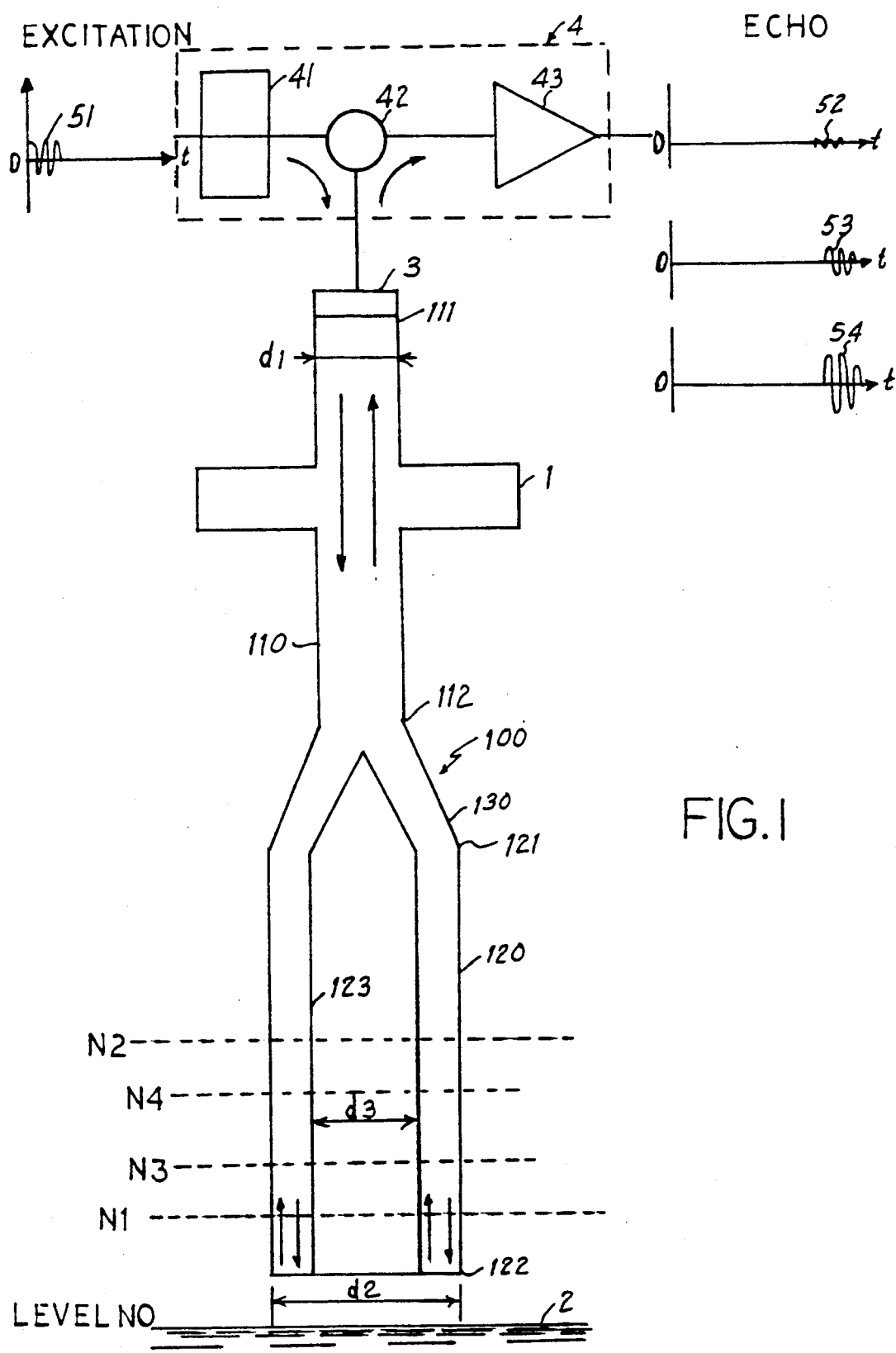
FIG. 1 is a diagrammatic view of a liquid level detector in accordance with the invention comprising a guide for acoustic waves shown in longitudinal section, together with electronic processing circuits.

FIG. 1 shows an example of a detector for detecting the presence or absence of a liquid 2 at a predetermined level nl in a tank (not shown in the drawing). The detector is fixed on a support 1 which may be constituted, for example, by a clamp.

The detector essentially comprises an acoustic waveguide 100 whose bottom free end 122 is situated inside the tank containing the liquid 2, with said end being immediately below the said predetermined level n1. The top free end 111 of the waveguide 100 carries a transducer 3, e.g. a PZT piezoelectric ceramic, with the electrodes of the transducer being connected to an excitation and processing circuit 4.

The circuit 4 includes a wave train generator 41 for generating wave trains 51 which are applied via logic gates 42 to the transducer 3, thereby causing acoustic waves to be emitted which are then transmitted along the waveguide 100 down to its bottom free end 122. When the free end 122 is not in contact with the liquid, as shown in FIG. 1, then the emitted wave train 51 is reflected from the end 122 of the tube 100 causing an echo to appear at the top end 111, which echo is applied to the transducer 3 and transmitted in the form of an electrical signal via the logic gate 42 to processing circuits 43 comprising an amplifier and a display member or a threshold detector.

When the liquid 2 is positioned at a level n0, as shown in FIG. 1, the echo is in the form of a large amplitude wave train 54 which is offset in time relative to the wave train 51 emitted by the transducer exciting circuits 41. The time offset between the wave trains 51 and 54 corresponds to the go and return travel time of the acoustic wave train along the waveguide 100.

Figure 5:
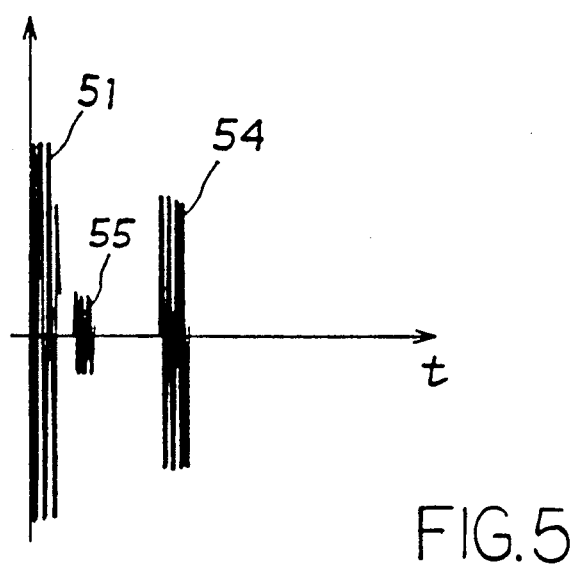
FIGS. 5 and 6 show an example of displayable signals from the detectors of FIGS. 1 and 2, corresponding respectively to the case where the acoustic waveguide is not in contact with the liquid and to the case where the acoustic waveguide has at least its bottom end dipped in the liquid.
Figure 6:
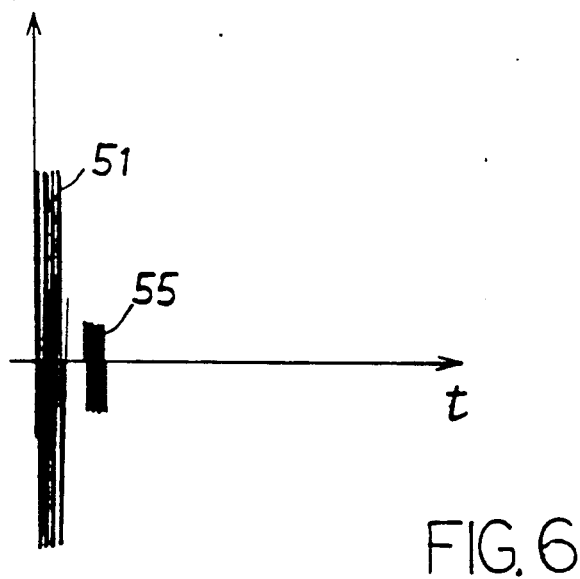

When the liquid level 2 reaches the bottom free end 122 of the waveguide 100 (level n1), the acoustic wave train emitted by the transducer 3 is absorbed by the liquid, thereby giving rise to considerable attenuation in the reflected wave train. The amplitude of the echo 53 is thus lower than that of the echo 54. If the liquid covers all of the bottom portion of the waveguide 100, e.g. up to a level n2, then the wave train 52 reflected in the form of an echo disappears completely. The level n2 at which the echo disappears completely may be situated, for example, at about 10 cm from the bottom end 122. FIGS. 5 and 6 show the waveform of the signal that may be observed at the output of the amplifier circuit 43 respectively when the waveguide 100 is completely out of the liquid (e.g. the liquid 2 is at level n0 of FIG. 1), and when the liquid level lies above the bottom end 122 of the waveguide 100 (e.g. when the liquid reaches the level n2 of FIG. 1).

An essential feature of the detector of the present invention lies in providing a waveguide 100 which is composite, having a first portion 110 on which the waveguide support means 1 act and having an outside surface which is relatively insensitive to external actions, and a second portion 120 having an outside surface which is highly sensitive to the presence of a liquid. This structure makes it possible to avoid the means used for fixing the waveguide 100 on a support 1 having an influence on detection, thereby making the device more reliable than prior binary detector devices, and making its operation more uniform. In addition, an appropriate choice of shape for the second portion 120 makes it possible to adjust the sensitivity of the waveguide 100 to liquid contact without it being necessary to modify or adapt the support means acting on the first portion 110.

As can be seen in FIG. 1, the insensitive first portion 110 of the waveguide 100 is essentially constituted by a solid cylinder having a relatively small outside diameter d1, whereas the sensitive second portion 120 of the waveguide 100 comprises a cylinder which is preferably tubular and having an outside diameter d2 which is significantly greater than that of the solid cylindrical first portion 110.

The bottom portion 112 of the solid cylindrical first portion 110 is connected to the top portion 121 of the larger diameter cylindrical second portion 120 by a linking portion 130 whose outside surface may be frustoconical or bell-shaped. The waveguide 100 is preferably made as a single piece of metal, e.g. a stainless steel or an aluminum alloy.

Figures 3, 4:
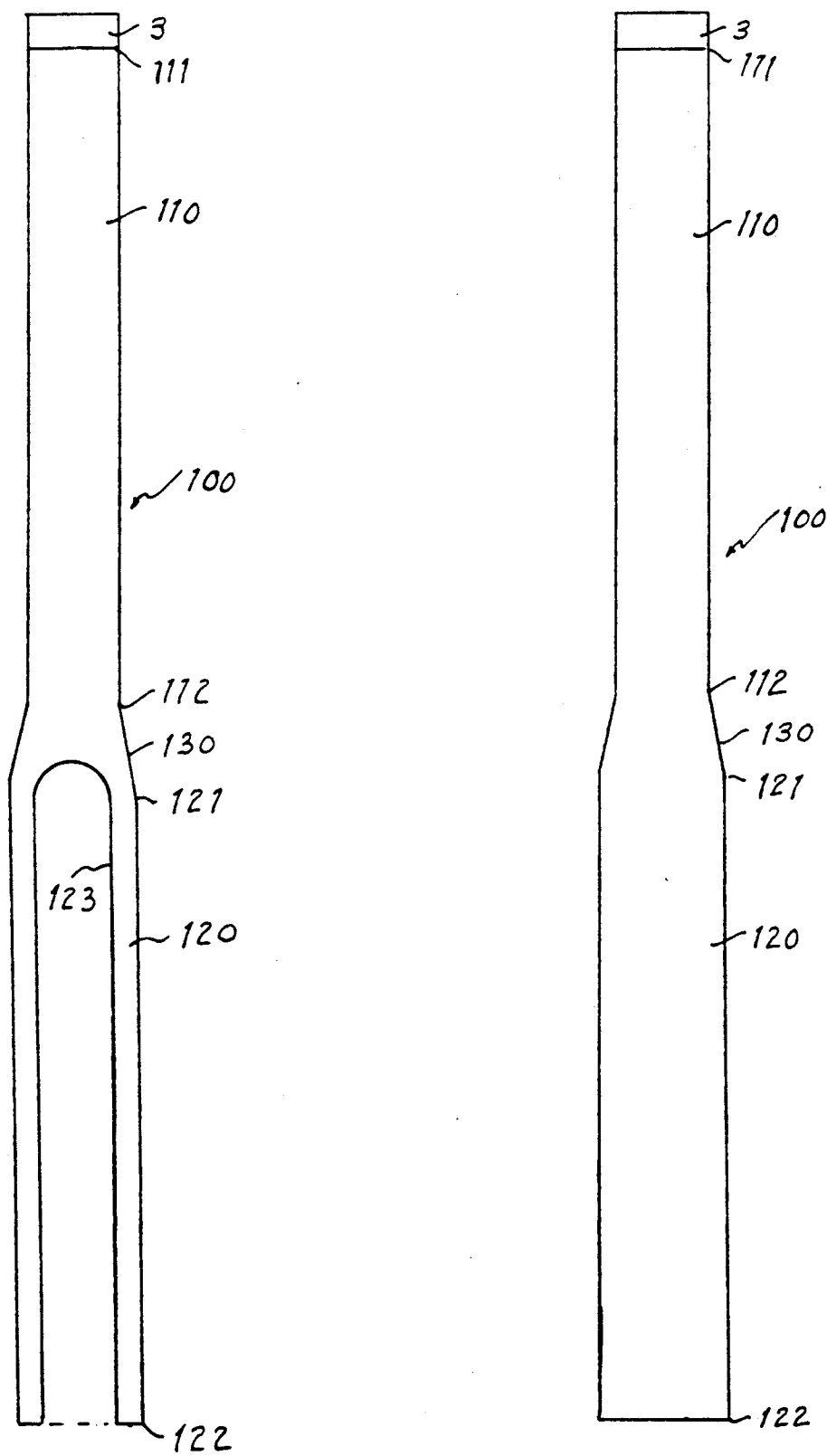
FIG. 3 is a longitudinal section through an example of a composite tube waveguide usable in the detector of FIG. 1 or FIG. 2.
FIG. 4 is a longitudinal section through an example of a composite solid waveguide usable in the detector of FIG. 1 or FIG. 2.

FIGS. 3 and 4 show two variant embodiments of a waveguide 100 of the invention.

In FIG. 3, the bottom portion 120 of the waveguide 100 is tubular defining a hollow space 123 inside the waveguide. This makes it possible to increase detection sensitivity and to select excitation frequencies for the wave trains that are not too high, e.g. frequencies of about 75 kHz to 125 kHz. The hollow space 123 may naturally be closed at its bottom end 122 in order to prevent liquid and any particles that may be in suspension in the liquid from penetrating into the cavity 123. Nevertheless, it is preferable for the plate closing the end 122 to be made of a material that does not have any significant influence on the propagation and reflection of acoustic waves.

FIG. 4 shows a solid waveguide 100 comprising a solid cylindrical top first portion 110 and a bottom second portion 120 which is likewise a solid cylinder but of considerably greater diameter than the first portion 110. A short frustoconical portion 130 interconnects the liquid-insensitive first portion 110 and the liquid-sensitive second portion 120. This second embodiment is a little less sensitive than the embodiment of FIG. 3 but it presents advantages, e.g. for use in a highly aggressive medium.

The detector of the invention is particularly robust due to the fact that it includes no moving parts and due to the fact that it may be easily and securely fixed via its first portion 110. Its operation is independent of the characteristics (resistivity, permittivity, specific heat, ...) of the liquid. It does not require any electricity to flow inside the tank. Its sensitivity is easily selected insofar as it depends only on the dimensions of the bottom portion 120 which is sensitive to liquid contact.

In order to explain how the geometrical and dimensional characteristics of waveguides 100 are determined and how the predetermined excitation frequency of the transducer 3 is selected, four lengths of stainless steel cylindrical waveguide of different dimensions are considered by way of example.

A first length of cylindrical waveguide A is constituted by a solid cylindrical bar of relatively small diameter (14 mm in the example under consideration). This length of cylindrical waveguide A may thus correspond to the solid first portions 110 of the waveguides 100 in FIGS. 1 to 4.

A second length of cylindrical waveguide B is constituted by a solid cylindrical bar of greater outside diameter (20 mm in the example under consideration). This length of cylindrical waveguide B may thus correspond to the larger-section solid second portion 120 of the waveguide 100 of FIG. 4.

A third length of cylindrical waveguide C is constituted by a cylindrical tube having an outside diameter similar to that of the solid cylinder second bar B (20 mm in the example under consideration) having relatively thick walls (inside diameter of 12 mm in the example under consideration). This length of cylindrical tubular waveguide C may thus correspond to the tubular second portion 120 of the waveguide 100 in FIGS. 1 to 3.

A fourth length of cylindrical waveguide D is constituted by a cylindrical tube having an outside diameter similar to that of the solid cylindrical second bar B (20 mm in the example under consideration) and having walls that are relatively thin (inside diameter 16.6 mm in the example under consideration). This length of cylindrical tubular waveguide D may thus likewise correspond to the tubular second portion 120 of the waveguide 100 in FIGS. 1 to 3.

Figure 7:
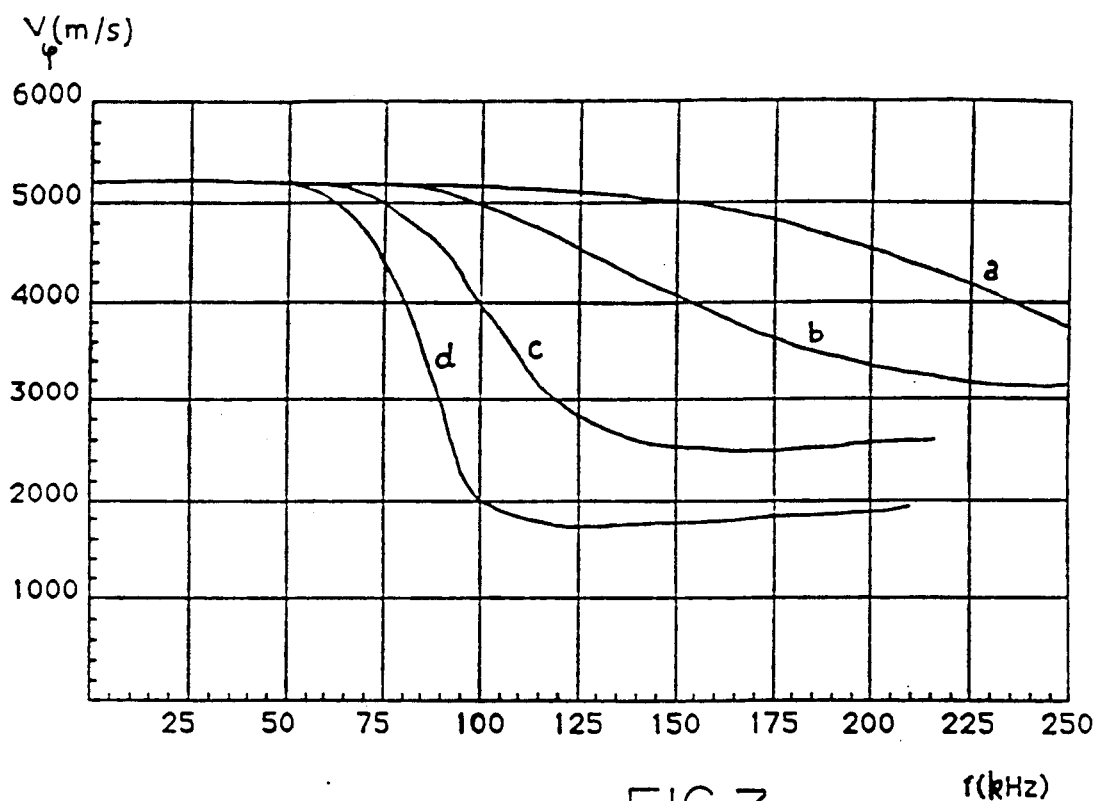
FIG. 7 is a graph with curves showing the variation in phase velocity in meters per second as a function of frequency in kilohertz for acoustic waves propagating in tubes and in solid cylinders of various different sections.

In FIG. 7, curves a, b, c, and d show the variation of phase velocity of the wave trains expressed in meters per second (m/s) and plotted as a function of frequency f expressed in kilohertz for acoustic waves propagating along steel cylindrical waveguides corresponding to above-defined waveguides A, B, C, and D.

It can be seen that curves a, b, c, and d coincide at low frequencies (less than 50 kHz) and also at high frequencies (above 300 kHz). At low frequencies the acoustic waves are constituted by longitudinal bulk waves, whereas at high frequencies the acoustic waves are constituted by surface waves (Rayleigh waves). The waveguide of the invention is not designed to operate with surface waves. Thus, curves a, b, c, and d have not been extended to very high frequencies. It should however be observed that the velocity of surface waves is always less than that of low frequency waves. The shape of the curves a, b, c, and d shows that all of them tend towards a surface wave velocity of about 3000 m/s whereas the very low frequency velocity is higher than 5000 m/s. As a result, each of the curves a, b, c, and d has a point of inflection.

Figure 8:
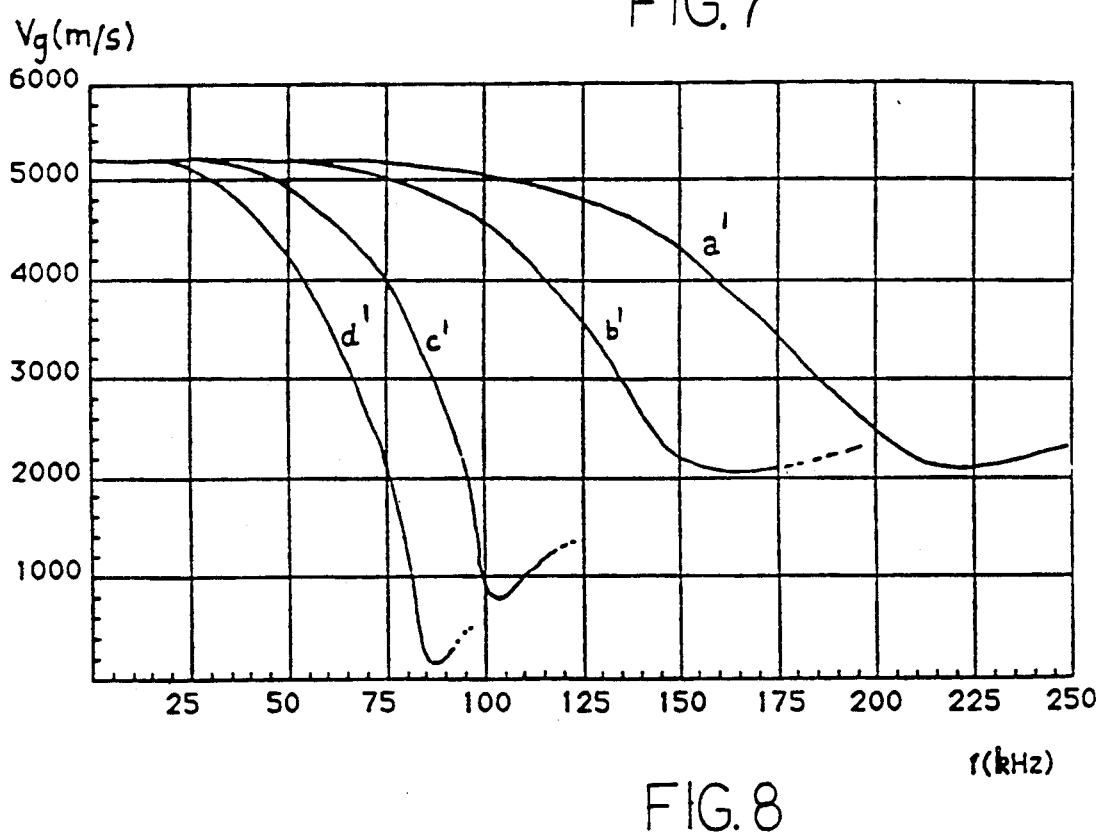
FIG. 8 is a graph with curves showing the variation in group velocity in meters per second as a function of frequency in kilohertz for acoustic waves propagating in tubes and in solid cylinders of various different sections.

FIG. 8 shows curves a', b', c', and d' representing variation in group velocity of the wave trains expressed in m/s and plated as a function of frequency f expressed in kilohertz for acoustic waves propagating along cylindrical waveguides corresponding to above-defined waveguides A, B, C, and D.

It can be seen that each of the curves a', b', c', and d' representative of group velocity passes through a minimum. If the curves a, b, c, and d of FIG. 7 are compared with the curves a', b', c', and d' of FIG. 8, it can be seen that the steeper the slope of the phase velocity curve a, b, c, or d at its point of inflection, the lower the value of the minimum reached by the corresponding group velocity curve a', b', c', and d', which thus corresponds to wide dispersion.

Experience shows that the sensitivity of a cylindrical waveguide to contact with a liquid increases with increasing dispersion.

The composite waveguide 100 of the invention has a first portion 110 with little dispersion and low sensitivity behaving in the manner shown by curves a and a' insofar as said first portion is constituted by a solid cylinder of relatively small diameter. The first portion 110 of the low sensitivity to contact with liquid is little affected by the forces exerted by the support means, and performs its waveguide function fully for acoustic wave trains emitted by the transducer 3 in the form of pulses having a predetermined carrier frequency fi.

In contrast, the second portion 120 of the composite waveguide 100 is made so that its behavior corresponds to curves b, b'; c, c'; or d, d' and is thus very dispersive and very sensitive to liquid contact.

It may be observed that the second portion 120 has increasing sensitivity depending on whether it is made in the form of a solid cylinder of larger section than the first portion 110 (curves b, b'), or in the form of a thick-walled cylindrical tube of larger section (curves c, c'), or else in the form of a thin-walled cylindrical tube of larger section (curves d, d').

Figure 2:
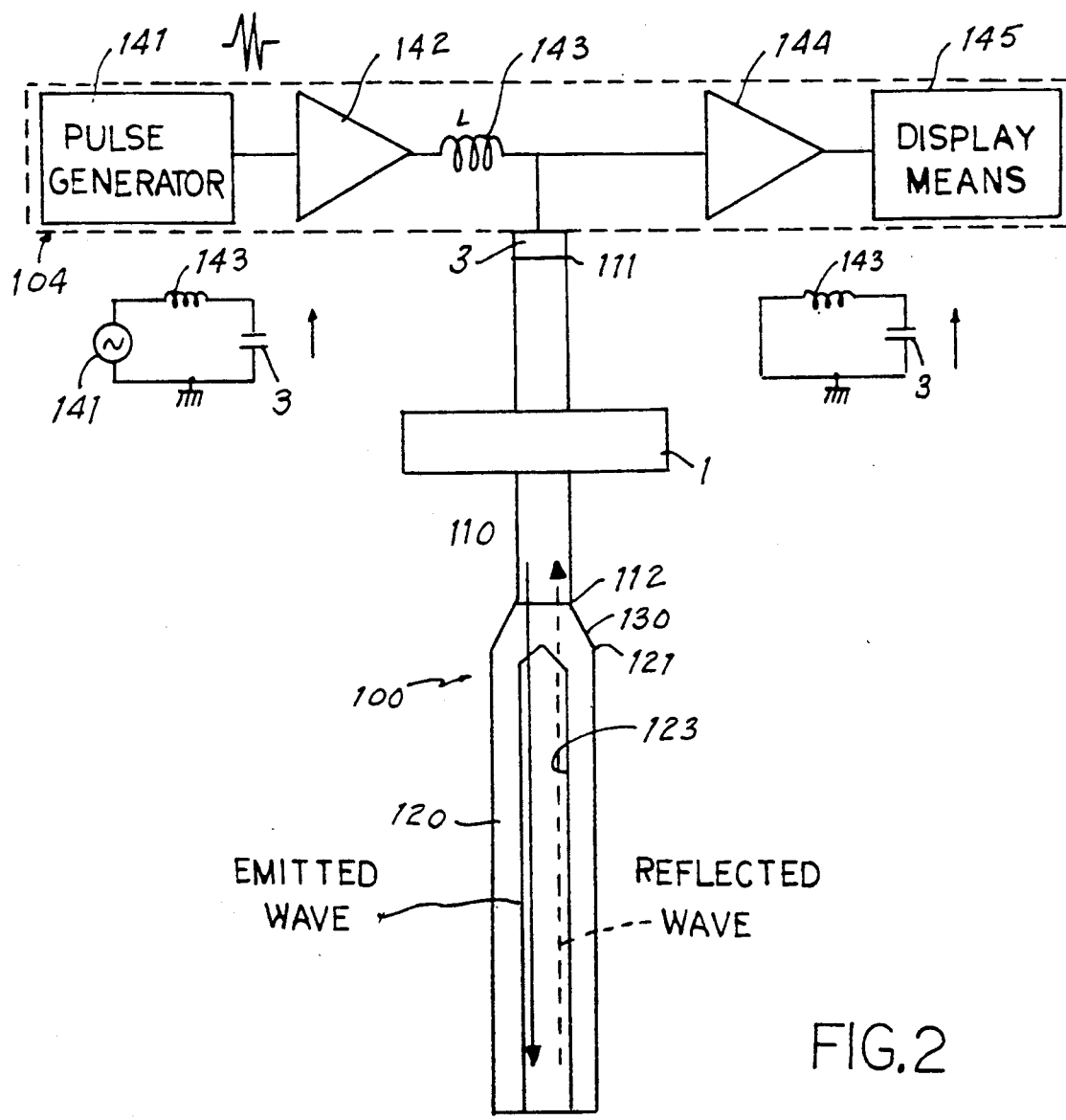
FIG. 2 is a diagrammatic view of a liquid level detector analogous to the detector of FIG. 1, but fitted with electronic processing circuits constituting a variant of the embodiment shown in FIG. 1.

The sensitivity selected for the second portion 120 of the waveguide 100, and thus the selected shape and dimensions of said second portion 120 depends on the intended application. The wave train carrier frequency is determined to match the choice of characteristics for the second portion 120 of the waveguide. Thus, with a composite waveguide 100 whose bottom portion 120 is tubular, as shown in FIGS. 1 to 3, the excitation frequency (e.g. about 100 kHz) must be less than the excitation frequency (e.g. about 160 kHz) that would be selected for a composite waveguide 100 whose bottom portion 120 is solid as shown in FIG. 4. The thinner the wall of the tubular bottom portion 120, the lower the excitation frequency. For a composite waveguide of given shape and size, sensitivity can be adjusted over a certain range of values as a function of the value selected for the excitation frequency.

In most applications, the composite waveguide 100 of the invention operates satisfactorily if the outside diameter d2 of the cylindrical second portion 120 is not less than the outside diameter d1 of the cylindrical first portion 100 multiplied by a coefficient of 1.3, and if the value of the predetermined frequency $f_i$ is selected so that the acoustic wave trains propagate in the cylindrical first portion 110 at the low frequency wave group velocity and in the cylindrical second portion 120 at the minimum group velocity corresponding to the point of inflection in the curve of phase velocity as a function of frequency.

By way of example, the outside diameter of the cylindrical first portion of the waveguide is equal to 14 mm, the outside diameter of the cylindrical (and optionally tubular) second portion of the waveguide is 20 mm, with the inside diameter lying in the range 0 mm to 18 mm, and said predetermined frequency $f_i$ is in the range 75 kHz to 175 kHz.

The longitudinal dimensions of the waveguide 100 are not critical. For example, the cylindrical first portion 110 may have a length in the range about 50 mm to about 150 mm, e.g. 100 mm, and the cylindrical second portion 120 may have a length in the range about 80 mm to about 200 mm, e.g. 100 mm, with the linking portion 130 having a length in the range about 10 mm to about 30 mm.

The repetition rate at which measurement wave trains are periodically launched into the waveguide is selected as a function of the speed with which the level of the liquid may vary.

FIG. 2 shows a detector in which the electronic processing circuits are implemented in accordance with a particular embodiment of the invention. The circuits for producing excitation pulses comprise a series connection constituted by a generator 141, an amplifier 142 having low output impedance, and an inductor 143 whose inductance is determined in association with the capacitance of the transducer to constitute a series-resonant circuit at the predetermined carrier frequency $f_i$. The circuits for detecting pulses delivered by the transducer 3 comprise an amplifier 144 having high input impedance, and display means 145 or means for analyzing the signals delivered by the amplifier 144.

The FIG. 2 circuit is simple and easy to implement since the inductor 143 can be connected directly between the amplifier 142 and 144, with the point common to the inductor and the input of the amplifier 144 being connected to one of the electrodes of the transducer 3. Since the output impedance of the amplifier 142 is low, the voltage induced by the echo reflected by the waveguide 100 in the absence of liquid at its free end 122 appears across the terminals of a parallel-resonant circuit constituted by the inductor 143 and the transducer 3. This induced voltage is applied to the amplifier 144 which then enables the presence or absence of an induced voltage representative of the absence or presence of liquid at the bottom end of the waveguide 100 to be displayed or to be compared with a predetermined threshold in a comparator circuit. As mentioned with reference to FIG. 1, when the liquid reaches the level n1 close to the bottom free end 122 of the waveguide 100, the echo 53 returned by said free end 122 and corresponding to the incident wave train 51 is attenuated, but it remains detectable, whereas when the liquid reaches level n2 situated at a certain distance, e.g. a few centimeters, above level n1, then the echo returned by the free end 122 and corresponding to the same incident wave train 51 disappears completely and is no longer detectable by the processing circuits 43.

By using the processing circuits 43 to make comparisons with a plurality of different threshold levels lower than the level corresponding to the amplitude of the echo 53 when the liquid reaches the level n1, it is possible to use a single waveguide 100 for detecting the presence of liquid at various different levels between the levels n1 and n2, with each of the levels n1, n3, n4, and n2 corresponding to a different amplitude of the echo produced at the free end 122 of the waveguide 100.

By way of example, four such levels n1, n3, n4, and n2 may be provided at intervals of about 1 cm. The processing circuits 43 then comprise a comparator circuit having four different thresholds, and a plurality of indicator lamps may be provided at the output from the circuits 43 with each lamp lighting when the liquid reaches a corresponding one of the predetermined levels n1, n3, n4, and n2. Such a multilevel detector can naturally be implemented using the variant of FIG. 3 or the variant of FIG. 4 in association with the circuit of FIG. 2 or the circuit of FIG. 1

Further, the linking portion 130 interconnecting the solid cylindrical top portion 110 of small cross-section and the bottom portion 120 sensitive to the presence of a liquid may give rise to a permanent secondary echo 55 (FIGS. 5 and 6) of greater or lesser amplitude depending on the way in which the linking portion 130 is made. This permanent secondary echo 55 occurs after a shorter time interval than the echoes 52, 53, or 54 returned by the bottom free end 122 of the waveguide 100. As a result, this permanent secondary echo 55 is easily discriminated by the processing circuit 43. However, the permanent secondary echo 55 may advantageously be made use of as an indicator that the detector device is emitting acoustic waves properly. Thus, when the liquid reaches level n2 so that the echo representative of liquid present at the free end 122 disappears, the persistence of the secondary echo 55 serves to verify that the detector is continuing to operate properly.

Naturally this characteristic is merely optional and the link portion 130 may equally well be made in such a manner as to reduce the secondary echo 55 almost completely.

Further, the description made with reference to FIG. 1 refers to a single transducer means 3 acting both as an emitting transducer and as a receiving transducer. It would naturally be possible to dispose distinct emitter and receiver transducer means in the vicinity of the first free end 111 of the waveguide, with said distinct means co-operating respectively with the circuits 41 for producing excitation pulses and with the circuits 43 for detecting reflected pulses.

The detector of the invention is suitable for operating with a wide range of liquids providing they are compatible with the waveguide material. These liquids include: water, hydrocarbons, and numerous chemicals.

We claim:

1. A liquid presence detector having a composite waveguide for acoustic waves, the detector comprising:
   (a) a metal waveguide mounted on a support and having a first free end situated in a zone which is not accessible by the liquid, and a second free end situated inside a receptacle containing a liquid, beneath a predetermined plane at the level where the presence or absence of liquid is to be detected;
   (b) transducer means disposed in the vicinity of said first free end; and
   (c) electronic processing means comprising:
      (i) circuits for producing excitation pulses at a predetermined frequency $f_i$, which pulses are applied periodically to the transducer means to create incident acoustic waves in the waveguide; and
      (ii) circuits for detecting pulses delivered by the transducer means in response to an echo of the incident acoustic waves from the second free end of the waveguide in the absence of liquid;
   wherein the waveguide has a solid cylindrical top first portion of small section having an outside diameter of a first value d1 and fixed to a support, and a cylindrical rigid bottom second portion whose outside diameter has a second value d2 greater than said first value d1, said second portion extending the cylindrical first portion downwards and being connected thereto by a short linking portion, and wherein the value of the predetermined frequency $f_i$ is selected in such a manner that the acoustic wave trains propagate in the cylindrical first portion at the group velocity of low frequency waves and propagate in the cylindrical second portion at the minimum group velocity corresponding to the point of inflection in the curve of phase velocity as a function of frequency.

2. A detector according to claim 1, wherein said cylindrical second portion is tubular in shape.

3. A detector according to claim 1, wherein said short linking portion has an outside surface which is bell-shaped.

4. A detector according to claim 1, wherein short linking portion has an outside surface which is essentially frustoconical in shape.

5. A detector according to claim 1, wherein the composite waveguide is made of stainless steel.

6. A detector according to claim 1, wherein the outside diameter of the cylindrical first portion of the waveguide is not less than 10 mm, the outside diameter of the cylindrical second portion of the waveguide is in the range about 15 mm to about 25 mm, and said predetermined frequency $f_i$ is in the range about 75 kHz to about 175 kHz.

7. A detector according to claim 1, wherein the first cylindrical portion has a length in the range about 50 mm to about 150 mm, the second cylindrical portion has a length in the range about 80 mm to about 200 mm, and the linking portion has a length in the range about 10 mm to about 30 mm.

8. A detector according to claim 1, wherein the circuits for producing excitation pulses comprise a series connection constituted by a generator, an amplifier having low output impedance, and an inductor whose inductance is determined in association with the capacitance of the transducer means to define a series-resonant circuit at said predetermined frequency $f_i$, and wherein the circuits for detecting the pulses delivered by the transducer means comprise at least one amplifier having high input impedance and display means or means for analyzing the signals delivered by said amplifier.

9. A detector according to claim 1, wherein the transducer means is constituted by a piezoelectric ceramic.

10. A detector according to claim 1, wherein the circuits for detecting the pulses delivered by the transducer means include means for discriminating a permanent secondary echo created by the linking portion interconnecting the top portion and the bottom portion of the waveguide.

11. A detector according to claim 1, wherein the circuits for detecting the pulses delivered by the transducer means include display means or comparator means having a plurality of thresholds for detecting the presence of liquid at a plurality of levels situated above the second free end of the waveguide.

* * * * *